June 28, 1955  J. S. ROBBINS  2,711,889
MINING MACHINES WITH ADJUSTABLE CUTTER HEAD
Filed Dec. 23, 1953  3 Sheets-Sheet 1

INVENTOR.
JAMES S. ROBBINS
BY
Murray A. Gleeson
ATTORNEY

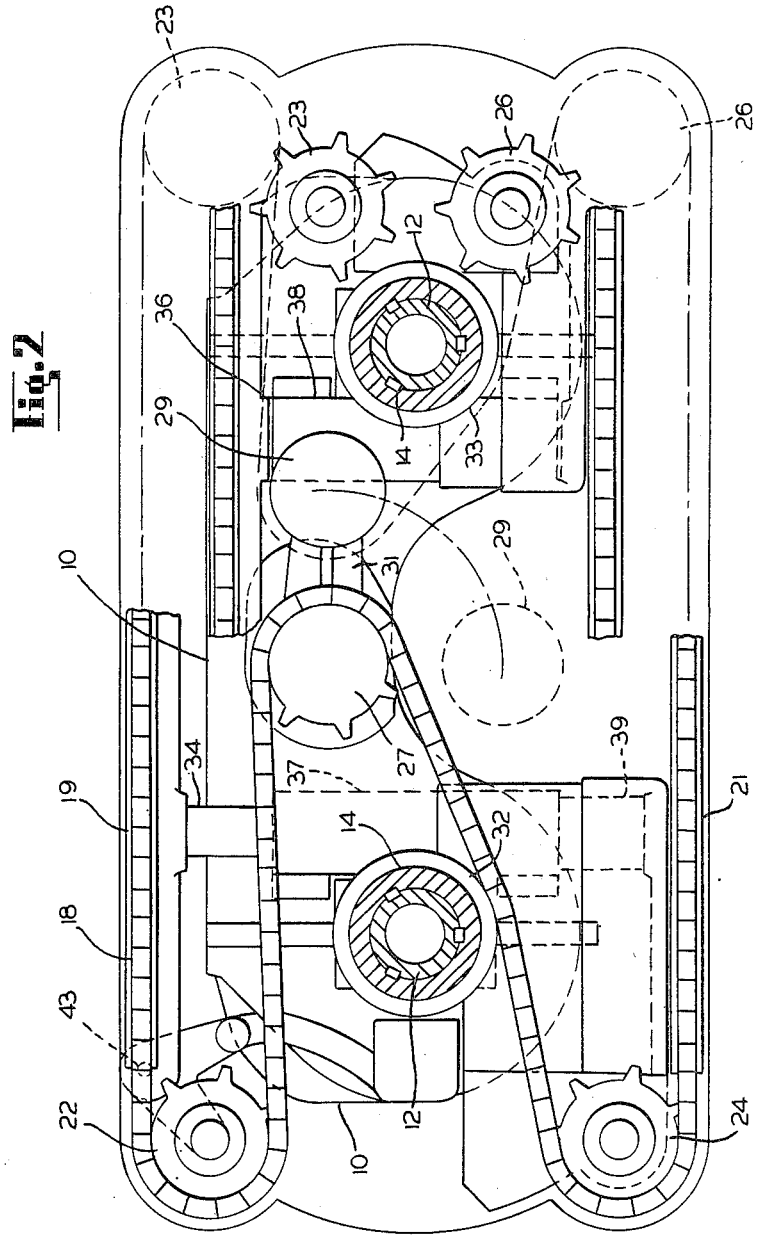

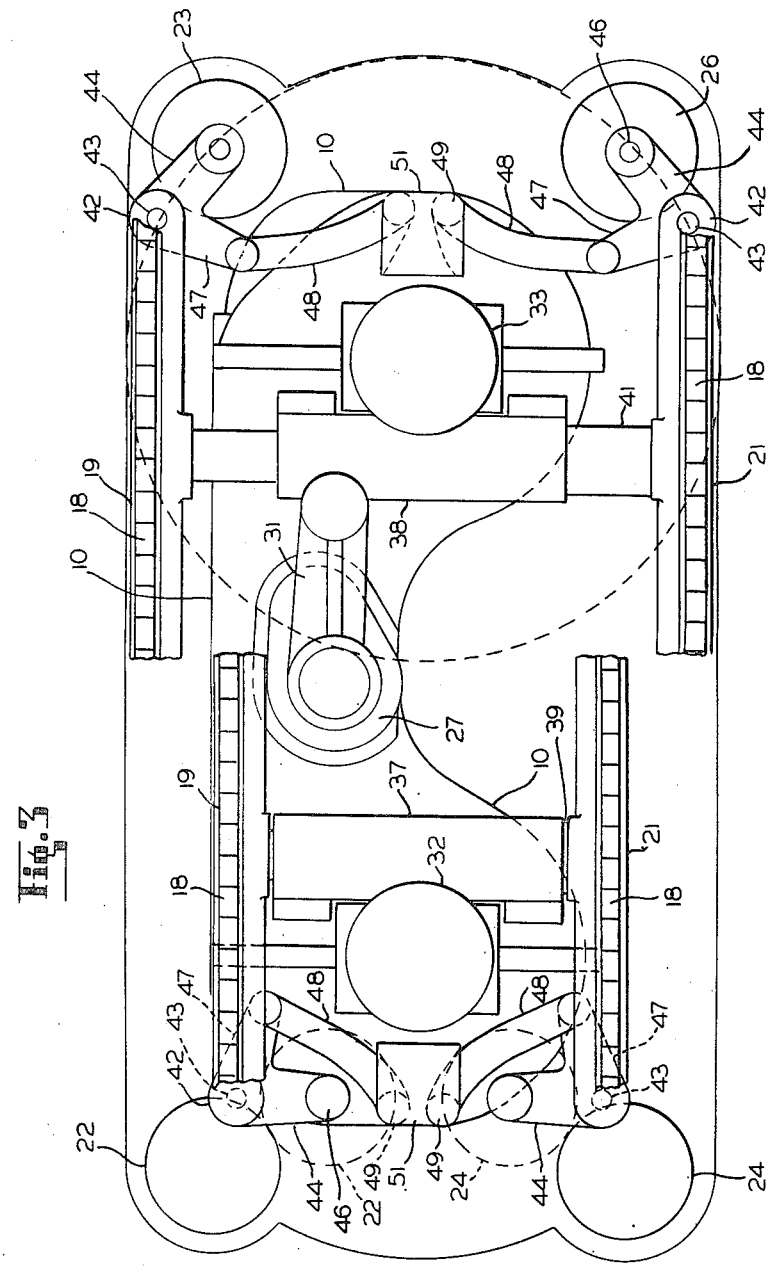

United States Patent Office 2,711,889
Patented June 28, 1955

2,711,889

MINING MACHINES WITH ADJUSTABLE CUTTER HEAD

James S. Robbins, Chicago, Ill., assignor to Goodman Manufacturing Company, Chicago, Ill., a corporation of Illinois Application December 23, 1953, Serial No. 399,865

1 Claim. (Cl. 262—9)

This invention relates generally to mining machines of the multiple bore type, and relates more particularly to an improved construction whereby the boring head is arranged to cut a substantially rectangular bore.

In a copending application of James S. Robbins, Ser. No. 390,519, filed November 6, 1953 for Improvements in Supports for the Boring Head of a Multiple Boring Type Mining Machine, there is shown a cutter head having a pair of boring arms which are arranged to rotate in a vertical plane so as to cut a pair of overlapping contiguous bores. The machine as disclosed in the aforesaid application shows an endless cutter chain which is guided along its upper and lower reaches so as to cut the cores left by the action of the boring arms.

In the machine disclosed in the aforesaid application, the endless cutter chain is trained around sprockets mounted at each end of the upper and lower guides for the cutter chain. By the arrangement shown in the aforesaid application it is possible for the cutter chains and the sprockets mounted at each end of the guides together with the boring arms to cut a substantially rectangular bore, thereby leaving sufficient space at each side of the continuous miner for roof pinning, timbering and for the operator.

In retracting such a machine from the room in which it operates, it is necessary to move the guides for the upper and lower reaches of the cutter chain toward each other. It is to the means for moving the sprockets and the cutter chain supports that this invention is particularly directed.

One of the principal objects of the invention is to provide a construction whereby the miner is able to cut a substantially rectangular bore in a mine seam, and to enable the means for cutting such a rectangular bore to be readily retracted.

Another object of the invention is to provide a simple mechanism which is interconnected to hydraulic means for retracting the upper and lower guides for the cutter chains, such mechanism being operable upon the movement of the guides to retract the chain sprockets disposed at each end of the guides. By such construction the miner may readily be moved away from the working face.

Other objects and important features of the invention will be apparent from a study of the following specification taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the appended claim.

In the drawings:

Fig. 2 is a view somewhat similar to Fig. 1, but showing the guides for the upper and lower reaches of the cutter chain in both extended and retracted position; and Fig. 3 is a somewhat schematic view similar to Figs. 1 and 2, showing the mechanism for retracting the sprockets mounted at the ends of the upper and lower cutter chain guides.

Figure 1:
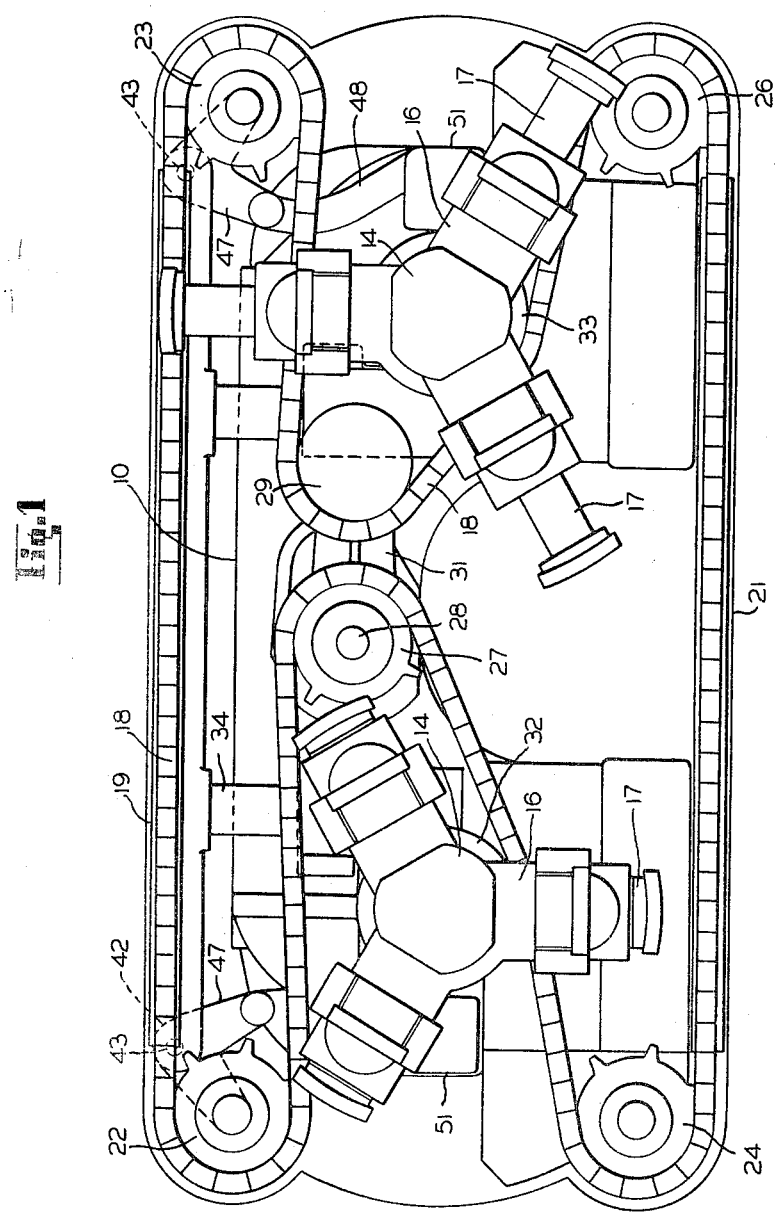
Fig. 1 is an elevation view of the boring head for a multiple bore type of continuous miner, said view showing the cutter chain and guides therefor in extended position.

Referring now to the drawings there is shown the gear housing 10 for the cutter head of a multiple bore type continuous miner. A pair of laterally spaced stub shafts 12, 12 extend from the gear housing 10, and support hubs 14, 14 for rotation therewith. Each of the hubs 14 has extending radially therefrom boring arms 16, and each of the boring arms 16 has extensions 17 whereby the diameter of the arms may be adjusted in accordance with the thickness of a seam in which the continuous miner is operating. In Fig. 1 the extensions 17 of the left hand boring arms 16 are shown as being retracted, while the extensions 17 of the right hand boring arms shown in Fig. 1 are shown in the extended position. Each of the boring arms 16 and their extensions 17 carry cutter bits in a manner well known in the art and as clearly described in the aforesaid Robbins application. The boring action by the arms 16, 16 leaves an upper core and a lower core which are removed by means now to be described.

Such means includes an endless cutter chain 18 having an upper reach which moves in an upper guide 19 and a lower reach shown which moves in a lower guide 21. The guides 19 and 21 are essentially U-shaped in transverse cross section, with the limbs of the U-shaped guide extending toward the working face of the seam. The cutter chain 18 thus moves between the limbs of the guide and is urged thereby against the cores left by the boring arms 16.

A pair of sprockets 22 and 23 are mounted one at each end of the upper guide 19, and a pair of sprockets 24 and 26 are mounted one each end of the lower guide 21. As seen in the several figures the endless chain 18 is trained around the sprockets 22, 23, 24 and 26 and a bight of the chain is driven by a sprocket 27 mounted on a shaft 28 extending from the gear housing 10. Another bight of the chain 18 is trained around an idler shoe 29 mounted at the end of an arm 31 having its center of turning common to the center of the shaft 28. The precise details of the driving sprocket 28, the idler shoe 29 and the arm 31 are as more clearly shown in an application of Carl A. Wilms, Ser. No. 391,598, filed November 12, 1953 for Improvements in Slack Takeup Devices, owned by the assignee of the present invention.

As seen in Fig. 1, the endless chain 18 is also guided past a circular shoe 32 fixed to the forward face of the gear case 10 and surrounding the hub 14 so as to space the chain 18 therefrom. The endless chain 18 is also guided past a fixed shoe 33 fixed to the gear case 10 and surrounding the other hub 14 so as to space the chain therefrom. The fixed shoes 32 and 33 are disposed behind the plane of rotation of the boring arms 16, 16.

The upper and lower reaches of the endless chain 18 and their guides 19 and 21 are maintained in proper distance apart by hydraulic means which will now be described. To this end the upper guide 19 is secured to piston rods 34 and 36 of a pair of laterally spaced cylinders 37 and 38. The lower chain guide 21 is likewise secured to piston rods 39 and 41 respectively, see also Fig. 3, of the respective cylinders 37 and 38. These cylinders are secured to the forward side of the gear housing 10 in any convenient manner and are disposed behind the plane of rotation of the boring arms 16, 16.

When the upper chain guide 19 and the lower chain guide 21 are moved to the extended position there is a concomitant movement of the sprockets 22, 23, 24 and 26 in a direction so as to be positioned with the upper chain guide 19 and the lower chain guide 21 so that a substantially rectangular bore is cut in the seam as seen in the respective figures. The aforesaid sprockets are also arranged to move in a retractile direction upon retraction of the upper and lower chain guides 19 and 21.

Means are accordingly provided for providing proper movement to the sprockets mounted upon the upper and lower chain guides as will now be described. Each of the sprockets is thus mounted at the ends of the upper guide 19 or the lower guide 21 upon a bell crank 42 having a pivotal connection upon a pin 43 secured to the end of the guide. Each bell crank 42 has an arm 44 supporting a particular sprocket by means of a pin 46 upon which the sprocket rotates. The bell crank 42 also has an arm 47 to which is pivotally connected a link 48 anchored pivotally at 49 to a support block 51 secured in any convenient fashion to the front side of the gear housing 10.

The action of the bell crank 42 and its cooperation with the movement of the upper chain guide 19 and the lower chain guide 21 is best shown with respect to the left hand portion of Fig. 3. As the upper chain guide 19 and the lower chain guide 21 move towards each other by action of the cylinders 37 and 38 the links 48 which pivoted to the support 51 will cause the sprockets to rock with respect to the chain guides 19 and 21. For example, sprockets 22 and 26 will be rocked by means of their links 48 in a counterclockwise direction with respect to their guides 19 and 21 as seen in Fig. 3; while sprockets 24 and 26 will be rocked by their links 48 and their bell cranks 42 in a clockwise direction with respect to their respective chain guides 19 and 21. Upon completion of the retractile movement of the guides 19 and 21 the sprockets will take the position as seen in the left hand portion of Fig. 3.

Such movement of the guides and the sprockets will cause the idler shoe 29 mounted upon the arm 31 to rotate in a clockwise direction with respect to the drive sprocket 27 for the chain 18. As seen with particular reference to Fig. 2, the idler shoe 29 takes the dotted position shown in takeup of the slack in the chain occasioned by such movement of the upper chain guide 19 and the lower chain guide 21 and the sprockets mounted thereon.

Upon such retractile movement of the guides and the sprockets mounted thereon the miner may readily be withdrawn from the room in which it operates. Furthermore, such retracted position of the guides and the sprockets enables the machine operator readily to make adjustments or changes to the boring arms 16, 16 disposed ahead of the cutter chain.

While the invention has been described in terms of a preferred embodiment thereof, such described embodiment is not intended to be limitative of the invention, the scope of the invention being intended to be limited only by the claim here appended.

I claim as my invention:

In a mining machine having a cutter head frame, at least a pair of boring arms journalled in said frame to cut overlapping contiguous bores in advance of the machine, two vertically spaced parallel chain carrying cutter guides for cutting the cores left by the action of said boring arms in cutting said overlapping bores, and means for adjusting said cutter guides toward and away from each other in a vertical plane, the improvement which consists in a bell crank pivotally mounted at each end of said cutter guides, a cutter chain sprocket rotatably mounted on one arm of each bell crank and a link pivotally connected between the other arm of each bell crank and the cutter head frame for rocking the sprocket on each bell crank to laterally extended position upon movement of its respective guide to vertically extended position.

No references cited.